United States Patent
Damgaard et al.

(10) Patent No.: US 10,954,997 B2
(45) Date of Patent: Mar. 23, 2021

(54) WIND TURBINE

(71) Applicant: Siemens Gamesa Renewable Energy A/S, Brande (DK)

(72) Inventors: Steen Damgaard, Herning (DK); Rune Nielsen, Ikast (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/503,135

(22) Filed: Jul. 3, 2019

(65) Prior Publication Data
US 2020/0018294 A1 Jan. 16, 2020

(30) Foreign Application Priority Data
Jul. 10, 2018 (EP) .................................. 18182559

(51) Int. Cl.
*F16C 17/04* (2006.01)
*F03D 80/70* (2016.01)
*F16C 17/10* (2006.01)

(52) U.S. Cl.
CPC .............. *F16C 17/04* (2013.01); *F03D 80/70* (2016.05); *F16C 17/107* (2013.01); *F05B 2240/50* (2013.01); *F16C 2360/31* (2013.01)

(58) Field of Classification Search
CPC ........ F16C 17/04; F16C 17/10; F16C 17/107; F16C 17/26; F16C 43/02; F16C 2360/31; F05D 2240/50; F05D 2240/52
See application file for complete search history.

(56) References Cited

U.S. PATENT DOCUMENTS

| 8,769,815 | B2* | 7/2014 | Shiraishi ................ F03D 80/50 |
| | | | 29/889.1 |
| 2003/0039419 | A1* | 2/2003 | Wobben ................ F03D 7/0204 |
| | | | 384/275 |
| 2014/0086515 | A1 | 3/2014 | Pedersen et al. |
| 2014/0086516 | A1 | 3/2014 | Pedersen et al. |
| 2019/0113026 | A1 | 4/2019 | Sorensen |

FOREIGN PATENT DOCUMENTS

| CN | 202273816 U | 6/2012 |
| CN | 202326009 U | 7/2012 |
| CN | 202954924 U | 5/2013 |

(Continued)

OTHER PUBLICATIONS

European Search Report dated Jan. 10, 2019 for Application No. 18182559.7.

(Continued)

*Primary Examiner* — James Pilkington
(74) *Attorney, Agent, or Firm* — Schmeiser, Olsen & Watts LLP

(57) ABSTRACT

Provided is a wind turbine including a tower and a nacelle rotatable relative to the tower by means of a yaw bearing arrangement having a yaw ring fixed relative to the tower, several upper sliding pads arranged between the upper side of the yaw ring and a sliding structure of the nacelle and several lower sliding pads arranged between the lower side of the yaw ring and the sliding structure, wherein the sliding pads are fixed to the yaw ring and that at least one radial opening is provided in the sliding structure allowing access to the upper or lower sliding pads.

10 Claims, 5 Drawing Sheets

(56) References Cited

FOREIGN PATENT DOCUMENTS

| DE | 102008004715 A1 | | 7/2009 |
|----|----|----|----|
| EP | 1406012 | * | 4/2004 |
| EP | 3139034 A1 | | 3/2017 |
| WO | 2008077983 A1 | | 7/2008 |
| WO | 2017162250 A1 | | 9/2017 |

OTHER PUBLICATIONS

Office Action in corresponding Chinese Patent Application No. 201910620422.1 dated Oct. 10, 2020. 6 pages.

* cited by examiner

WIND TURBINE

CROSS-REFERENCE TO RELATED APPLICATIONS

This application claims priority to European application No. 18182559.7, having a filing date of Jul. 10, 2018, the entire contents of which are hereby incorporated by reference.

FIELD OF TECHNOLOGY

The embodiments of the invention relate to a wind turbine, comprising a tower and a nacelle rotatable relative to the tower by means of a yaw bearing arrangement comprising a yaw ring fixed relative to the tower, several upper sliding pads arranged between the upper side of the yaw ring and a sliding structure of the nacelle and several lower sliding pads arranged between the lower side of the yaw ring and the sliding structure.

BACKGROUND

For adjusting the orientation of the hub of a wind turbine comprising the rotor blades the nacelle, to which the hub is connected, is rotatable relative to the tower. A yaw bearing arrangement allows this rotation of the nacelle. This yaw bearing comprises a yaw ring, which is fixed relative to the tower, usually it is fixed to an upper flange of the tower. The nacelle comprises one or several drive motors with sprockets meshing with the gearing of the yaw ring. A yaw bearing arrangement allows a guided rotation of the nacelle relative to the fixed tower. This yaw bearing arrangement comprises upper and lower sliding pads, which are arranged between the upper and lower side of the yaw ring and a respective sliding structure of the nacelle. The sliding pads are arranged in a ring form, so that all sliding pads together build a closed sliding ring. Usually the sliding pads or at least one of the upper and lower sliding pad is fixed to the sliding structure.

In modern wind turbines of the direct drive technology an uneven load rests on the yaw bearing arrangement due to the heavy weight of the generator and of the large rotors arranged at the hub. This results in a tilting moment or tilting force and thus in larger forces on the top sliding pads in the front, e.g. in the direction of the hub, and the lower sliding pads in the rear of the nacelle. Because of the increased force resting on these local sliding pads or sliding shoes an uneven wear occurs in the sliding pads arranged at the front and the lower sliding pads arranged at the back. Due to the increased wear the sliding pads need to be replaced more often.

The replacement of worn sliding pads is an extremely complex and effortful and also expensive operation. For changing the upper sliding pads it is necessary to use a crane for lifting the nacelle off the yaw ring and then change the upper sliding pads. Lifting the nacelle is necessary, as due to the uneven load the worn sliding pads are constantly loaded and therefore in contact with the sliding structure and the yaw ring. Also the change of the lower pads is a very complex and effortful operation, as also these pads are due to the uneven load constantly loaded and therefore need to be unloaded. For changing sliding pads a sliding tool as disclosed in EP 3 139 034 can be used. This tool arrangement comprises a sliding wedge which is to be inserted between the lifted and tilted nacelle and the yaw ring. It is obvious that this method of operation is very time consuming and effortful.

SUMMARY

An aspect relates to an improved wind turbine allowing an improved changing of the sliding pads.

For solving the problem a wind turbine as depicted above is characterized in that the sliding pads are fixed to the yaw ring and that at least one radial opening is provided in the sliding structure allowing access to the upper or lower sliding pads.

According to the embodiments of the invention the upper sliding pads as well as the lower sliding pads are fixed to the yaw ring. They are therefore locally fixed, they do not move with the nacelle. As they are fixed to the yaw ring and therefore to the tower, the position and number of the sliding pads which are loaded by the uneven load is always depending on the orientation of the nacelle relative to the tower. So the nacelle can shift the load around the sliding pads by yawing. This will reduce wear of the sliding bearing, as the high loads are distributed over a larger number of pads, and not always the same pads are heavily loaded. As the load is distributed, the wear over the time is reduced, resulting in a reduced sliding pad exchange rate.

The circumstance, that the load on the sliding pads, e.g. the whole sliding ring realised by the sliding pads, can be changed by changing the position of the nacelle furthermore allows it to move the nacelle in position where worn sliding pads, which need to be replaced, are unloaded. If for example upper sliding pads need to be changed, the nacelle is moved to a position, where the hub of the turbine is positioned at the opposite side of the sliding pads which need to be unloaded, while the back end of the nacelle is positioned close to these sliding pads. As the nacelle respectively the turbine tilts in the direction of the hub due to the heavy load of the generator close to the hub and the rotor blades etc. the worn upper sliding pads, which need to be changed, are therefore unloaded. In the unloaded state the worn sliding pads can be removed and new pads can be inserted. By changing the position of the nacelle from time to time the sliding pads making the whole upper ring can be changed one after the other. For changing the lower sliding pads the respective position of the nacelle relative to the fixed sliding pads is just the opposite, as those lower sliding pads are unloaded, which are close to the hub, while the sliding pads which are close to the back end of the nacelle are loaded.

As depicted above, the wind turbine furthermore comprises at least one radial opening in the sliding structure allowing access to the upper or lower sliding pads. This opening is a maintenance opening, allowing access to the upper or lower sliding pads, which can be replaced through this opening. The worker can access a sliding pad which needs to be changed with a respective tool, take the worn sliding pad from its position through the opening and insert a new sliding pad to the opening and finally fix it again with a respective tool. This is possible due to the unloaded state of the respective sliding pad. It avoids heavy lifting operation or the like as in the prior art. In fact a radial opening allowing access from the inside of the nacelle or tower is sufficient for performing the changing operation.

Preferably two axially displaced radial openings are provided in the sliding structure, with the upper opening allowing access to the upper sliding pads and the lower opening allowing access to the lower sliding pads. According to this embodiment the upper sliding pads as well as the lower sliding pads can be maintenanced through a respective upper and lower radial access opening, so that the inventive method of changing them can be performed in regard of both upper and lower sliding pads. It is also possible to service upper and lower sliding pads simultaneously, when the upper and lower opening are provided at opposite sides of the sliding structure, meaning they are displaced over 180° around the circumference of the circular sliding structure.

In another embodiment of the invention the sliding structure may comprise a bedframe sliding on the upper sliding pads and a bottom clamp ring sliding on the lower sliding pads attached either to an intermediate ring which is attached to the bedframe or directly to the bedframe, with the opening being provided in the intermediate ring or the bedframe, and/or the clamp ring. The sliding structure of the inventive wind turbine comprises a complete clamp ring which provides the lower sliding surface sliding on the lower sliding pads fixed to the yaw ring. By mounting this single sliding ring the whole bearing is strengthened, as the sliding ring is a rigid structure, compared to using several individual clamps for providing the sliding surface as it is necessary in the prior art. The upper sliding surface is provided by a bedframe of the nacelle, which bedframe is also a very rigid and stiff component. These two sliding components can either be fixed directly to each other, meaning that the bottom clamp ring is directly fixed to the bedframe. In this case either the clamp ring or the bedframe comprises a respective axial ring flange for connecting them. This axial flange also provides a guiding surface for radial sliding pads, which are preferably arranged and fixed to the inner circumference of the yaw ring. This axial flange or ring can be directly casted as a radial support and connecting ring to the bedframe, while it can also be an integral part of the bottom clamp ring.

Aside this direct connection of the bottom clamp ring and the bedframe it is possible to insert an intermediate ring providing a radial support and guiding surface for the radial sliding pads, which intermediate ring is arranged between the bottom clamp ring and the bedframe. In any case the whole bearing setup is very rigid and strengthened and allows a better bearing performance and an enhanced bearing lifetime.

The fixation of either the clamp ring to the bedframe of the clamp ring, the intermediate ring and the bedframe is preferably realised by means of several bolt connections. Preferably the bottom clamp ring and, if provided, the intermediate ring comprises respective through bores, while the bedframe comprises threaded blind holes, into which the respective threaded bolts are screwed.

As explained above, a central feature of the embodiments of the invention is the one or are the two radial maintenance openings provided in the sliding structure of the nacelle allowing access to the upper and/or lower sliding pads. However the sliding structure is built, the one or the two openings are provided in one or two respective sliding structure components. Especially the above mentioned setup of the sliding structure comprising the bottom clamp ring and either the respective axial flange or ring or the intermediate ring allow the provision of these openings, as they can be provided for example in the bottom clamp ring as a recess with a respective dimension, or in the axial flange or intermediate ring as a recess with a respective dimension. This opening or recess does not effect the mechanical properties of the sliding construction, but allows a simple access to the sliding pads for maintenance purpose.

The opening or each opening preferably has a slit like geometry. The dimension of the opening is chosen depending on the geometry and dimensions of the sliding pads, which need to be changed through this opening. The opening slit therefore has a height larger than the height of the sliding pads and a width larger than the width of the sliding pads for allowing an easy access to the sliding pads, while it is to be noted that the openings also shall not be too big for avoiding any influence of the mechanical properties of the sliding structure.

For fixedly arranging the upper and lower sliding pads to the yaw ring the yaw ring preferably comprises an upper ring shaped recess and a lower ring shaped recess, into which the upper and lower sliding pads are inserted. This recess is open to the inner circumference of the yaw ring, so that the recess can communicate with the respective opening adjacent to it allowing the respective sliding pad to be simply pulled out of its mounting position and a new sliding pad to be pushed in this mounting position.

Finally the yaw ring is attached to a radial flange of the tower by several bolt connections for tightly fixing the yaw ring. As the yaw ring is fixed to the tower, the maintenance worker can maintenance the sliding pad arrangement from the inside of the tower also allowing easy access to the maintenance area.

BRIEF DESCRIPTION

Some of the embodiments will be described in detail, with references to the following Figures, wherein like designations denote like members, wherein.

DETAILED DESCRIPTION

Figure 1:
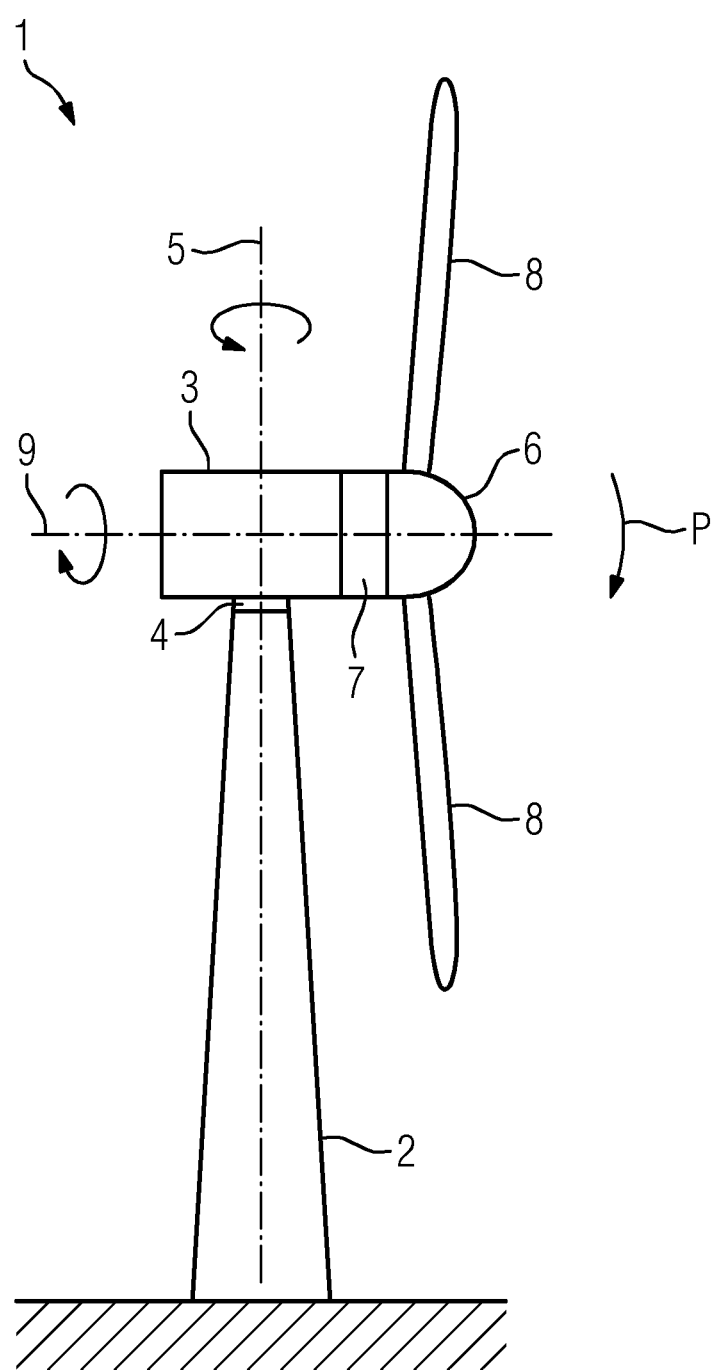
FIG. 1 shows a principal view of a wind turbine.

FIG. 1 schematically illustrates a wind turbine 1 comprising a tower 2. At the top of the tower 2 a nacelle 3 is mounted. The nacelle 3 is rotatable connected with the tower 2 via a yaw bearing arrangement 4. The yaw bearing arrangement 4 enables a rotational movement of the nacelle 3 around a yaw axis 5 relative to the tower, wherein the yaw axis 5 is orientated substantially vertically.

A hub 6 is rotatable connected to the nacelle 3 via a main bearing. The hub 6 is a part of the so called rotor, which rotor transfers rotational energy from the hub 6 to a generator 7, which generator produces electric energy from the rotational energy. For rotating the hub 6 a plurality of rotor blades 8 are arranged at the hub, which rotor blades 8 can, if need be, pitched relative to the hub 6. The hub 6 respectively the rotor blades 8 are rotatable around a substantially horizontal axis 9. The generator 7 is preferably directly connected to the rotor respectively the hub 6, the wind turbine 1 is therefore a direct-drive turbine. It is to be noted that it is also possible to arrange a gear box between the rotor respectively the hub 6 and the generator 7.

Figure 2A:
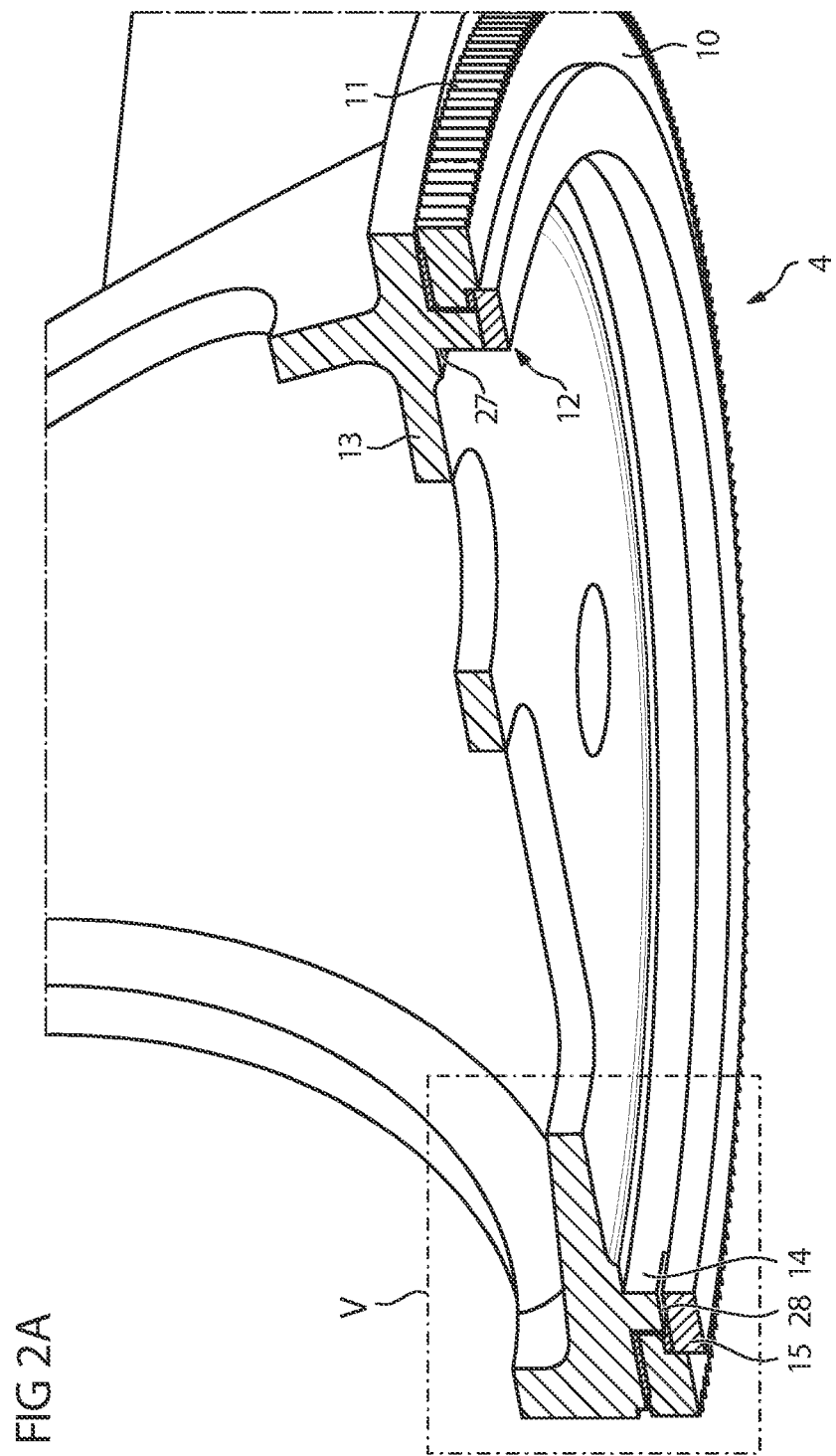
FIG. 2A shows a first cross sectional view through the yaw bearing arrangement and a part of the nacelle.
Figure 2B:
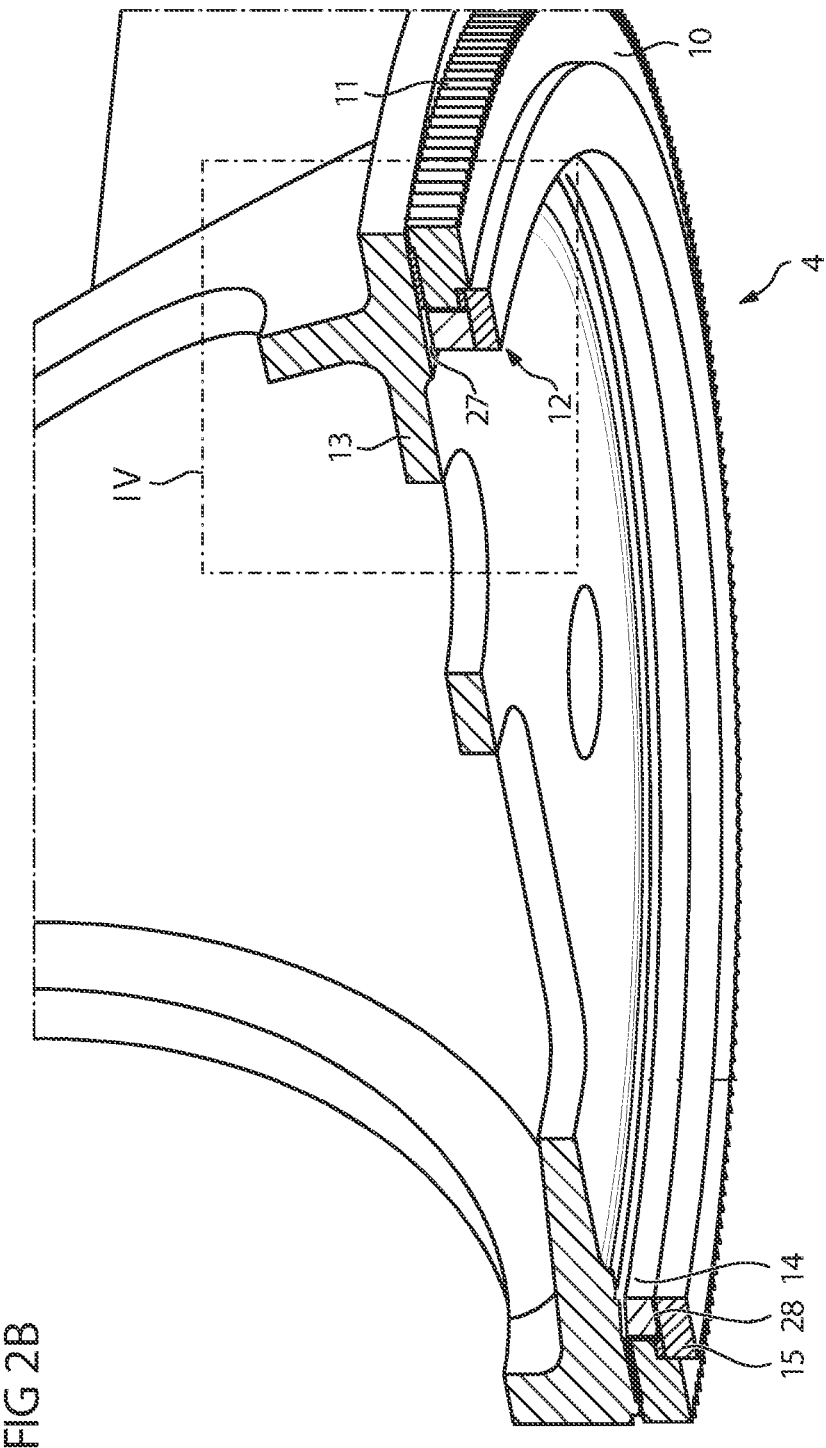
FIG. 2B shows a second cross sectional view through the yaw bearing arrangement and a part of the nacelle.

FIGS. 2A and 2B show a first and a second cross sectional enlarged view of the yaw bearing arrangement. The yaw bearing arrangement comprises a yaw ring 10 with a gearing 11 provided at its outer circumference. The yaw ring 10 is connected to a radial flange of the tower 2 by means of respective bolt connections.

The yaw bearing arrangement 4 comprises a sliding structure 12 being part of the nacelle for sliding on respective upper and lower sliding pads sandwiched between the upper side of the yaw ring 10 and the lower side of the yaw ring 10 and the respective sliding surfaces of the sliding structure 12.

The sliding structure 12 comprises a bedframe 13 with an axially extending ring flange 14 being an integral part of the bedframe 13 and extending axially and adjacent to the inner circumference of the yaw ring 10. This axial ring flange 14 provides a guiding surface or a mounting surface for additional radial sliding pads.

Finally the sliding structure 12 comprises a bottom clamp ring 15 which is attached to the bedframe 13 respectively the axial ring flange 14 by means of respective bolt connections.

Figure 3:
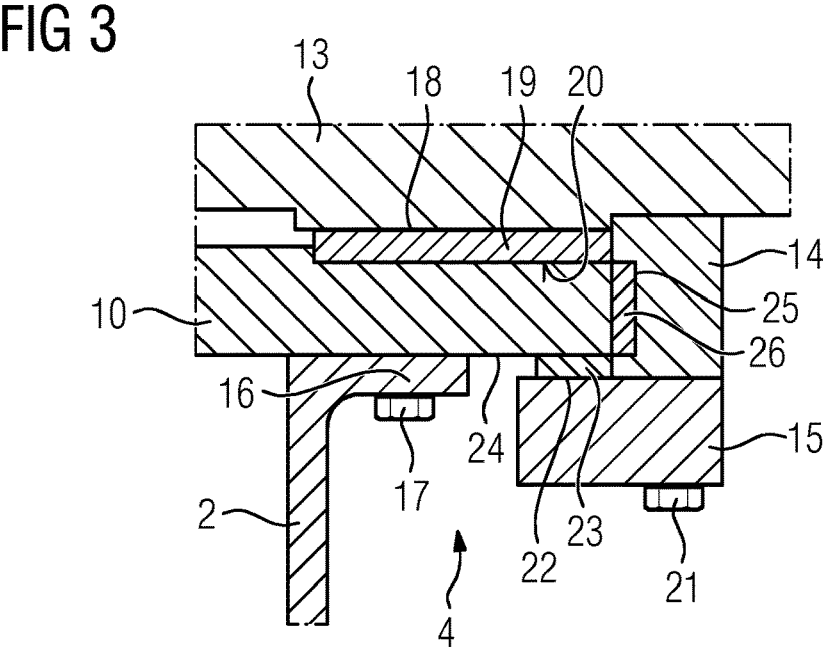
FIG. 3 shows an enlarged cross sectional view of the yaw bearing arrangement.
Figure 4:
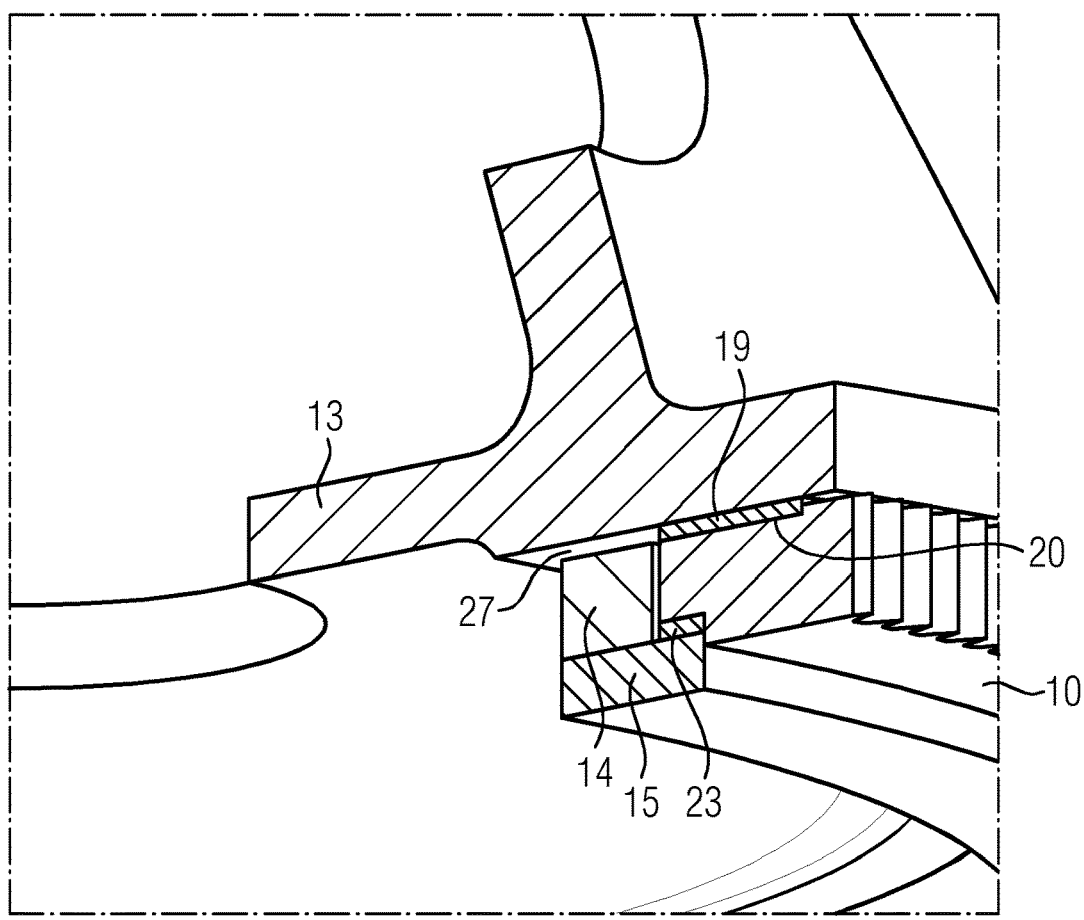
FIG. 4 shows an enlarged view of the section V in FIG. 2A showing the upper opening provided in the bedframe respectively an axial ring flange of the bedframe.

FIG. 3 shows a cross sectional view of the yaw bearing arrangement 4. As shown the yaw ring 10 is fixed to a radial flange 16 of the tower 2 by means of respective bolt connections 17. The bedframe 13 is provided with a guiding surface 18 sliding on upper sliding pads 19, which are fixedly arranged at the upper side of the yaw ring 10 in a respective recess 20. These sliding pads 19 are arranged around the circumference of the yaw ring 10 building a closed sliding ring.

FIG. 3 also shows the axial ring flange 14 and the bottom clamp ring 15 which is attached to the bedframe 13 by means of bolt connections 21. The bottom clamp ring 15 is provided with a sliding surface 22 sliding on lower sliding pads 23 which are also fixedly attached to the lower side 24 of the yaw ring 10. While not shown, they can also be arranged in a respective ring shaped recess, as will be apparent from the following drawings. The lower sliding pads 23 are also arranged in a ring form and build a closed sliding ring.

Finally FIG. 3 shows the axial ring flange 14 providing a sliding surface 25 sliding on radial sliding pads 26 which are also fixedly arranged at the inner circumference of the yaw ring 10, while these radial sliding pads 26 can also be fixed to the axial flange 25 and slide on a respective sliding surface of the yaw ring 10.

As explained above the upper and lower sliding pads 19 and 23 are fixedly attached to the yaw ring 10. Therefore they do not move while the nacelle 3 rotates relative to the tower 2 and thus relative to the tower side fixed yaw ring 10 and the sliding pads 19 and 23 fixed to the yaw ring 10. Due to the setup of the wind turbine 1 as shown in FIG. 1 a tilting moment or a tilting force resulting in an uneven load distribution rests on the yaw bearing arrangement 4 resulting from an uneven load distribution in the nacelle, as the hub 6 with the rotor blades 8 and the generator 7 are heavy components moving the center of gravity out of the center of the nacelle 3 respectively the tower 2. Therefore the nacelle 3 tilts relative to the tower 2, a tilting moment or tilting force rests therefore also on the upper and lower sliding pads 19 and 23. But as these sliding pads 19 and 23 are fixed to the yaw ring the uneven load distribution is distributed over almost all upper and lower sliding pads, as the position and number of the sliding pads uneven loaded depends on the orientation or position of the nacelle 3 relative to the tower 2 and thus relative to the fixed sliding pads 19 and 23. Therefore not always the same sliding pads 19 and 23 are uneven loaded, but the load distribution changes from time to time and therefore also the wear of the sliding pads 19 and 23 is more evenly distributed.

The fact that the sliding pads 19 and 23 are fixed to the yaw ring 10 and the fact that the load position changes with the position of the nacelle 3 relative to the tower 2 and the sliding pads 19 and 23 allows for a specific unloading of areas of the sliding pads 19 and 23, which sliding pads need to be changed due to maintenance operation. The nacelle 3 is simply rotated into a position, where those sliding pads, which need to be changed, are unloaded. As those upper sliding pads 19 are heavily loaded, which are, see FIG. 1, closer to the generator 7 and the hub 6, and as those lower sliding pads are heavily loaded, which are closer to the other end of the nacelle, it is easily possible to unload the respective sliding pads, which need to be changed, by changing the nacelle position.

For allowing an easy maintenance and sliding pad changing operation of the upper sliding pads 19 a radial opening 27 is provided in the bedframe 13 respectively the axial ring flange 14. This radial opening 27 having a slit-like geometry communicates with the recess 20 in which the upper sliding pads 19 are arranged and has a dimension that a sliding pad 19 can be accessed with a respective tool and can be pulled out of its mounting position through the opening 27, while a new sliding pad 19 can be inserted into to recess 20 via the radial opening 27. This opening 27 can easily be realised during the casting of the bedframe 13, an integral part of which is the axial ring flange 14. As this ring flange 14 can also be a separate intermediate ring, it is also simply possible to provide the respective opening 27 at this intermediate ring. In case this axial ring flange 14 is an integral part of the bottom clamp ring 15 the provision of the opening 27 is also quite simple.

For changing a sliding pad 19, the nacelle is moved to a position, where this sliding pad is unloaded, meaning that this sliding pad is positioned at the opposite side to where the hub 6 and the generator 7 is positioned. In this unloaded state the maintenance worker can access the unloaded sliding bearing 19, which is no longer in a tight loaded contact with the bedframe 13 and the yaw ring 10 and can therefore be removed, while a new one can be inserted.

Figure 5:
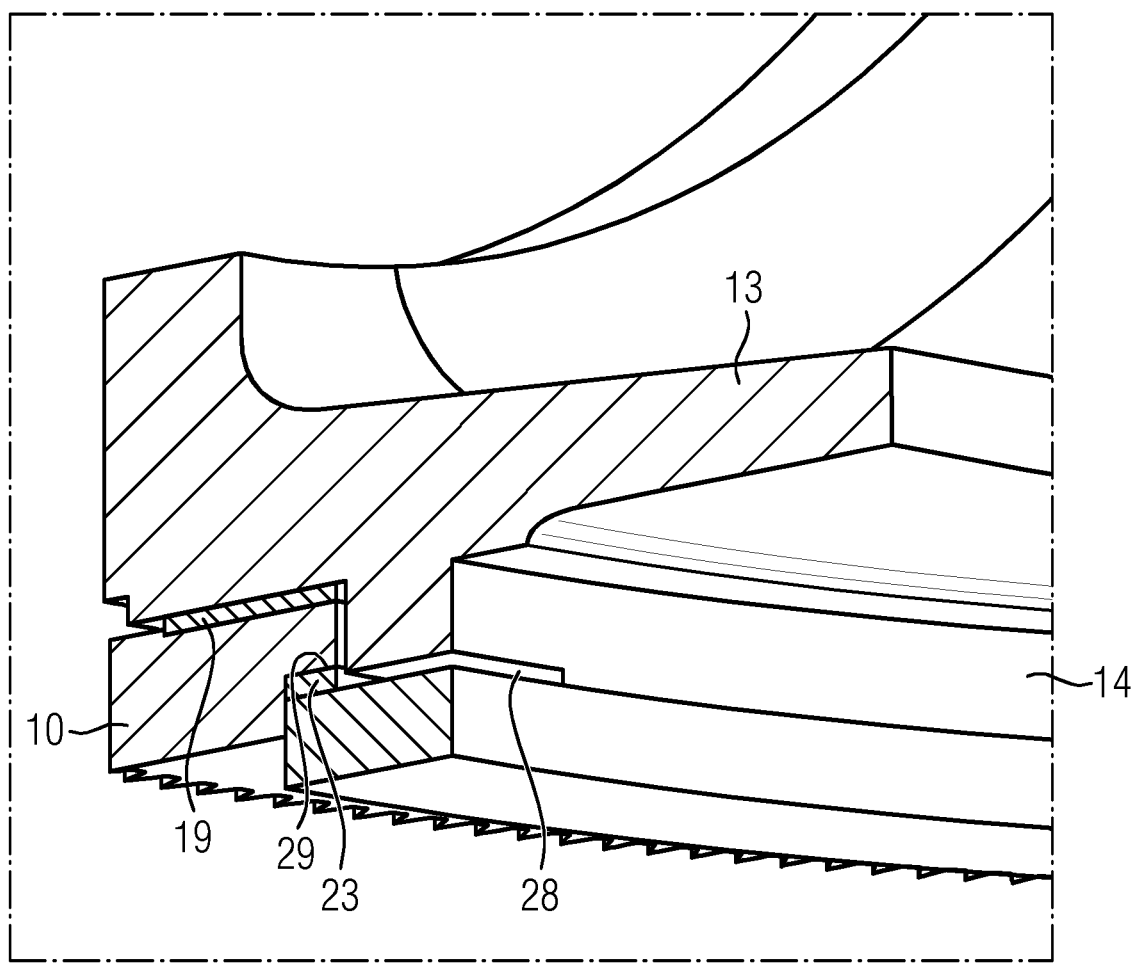
FIG. 5 shows an enlarged view of the section IV in FIG. 2B showing the lower opening provided in the bedframe respectively an axial ring flange of the bedframe.

For changing the lower sliding pads 23 another slit-like opening 28 is provided at the bottom side of the axial ring flange 14 of the bedframe 13, see FIG. 5. Also this opening 18 allows the maintenance worker to easily access the lower sliding pads 23, which are arranged in a respective recess 29 shown in this figure, which recess 29 is provided in the yaw ring 10 to which they are tightly fixed. Also this opening 28 has a geometry in height and width allowing to pull a sliding pad 23 out of its mounting position and insert a new one.

It is to be noted that the openings 27, 28 are arranged at 180° opposite positions at the sliding structure 12, see FIG. 2. This allows to simultaneously service an upper sliding pad 19 at one side and a lower sliding pad at the opposite side of the yaw bearing arrangement 4, as the upper sliding pad 19 and the opposite lower sliding pad 23 are simultaneously unloaded due to the tilting of the nacelle 3.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A wind turbine, comprising:
a tower; and a nacelle rotatable relative to the tower by means of a yaw bearing arrangement comprising a yaw ring fixed relative to the tower;
a plurality of upper sliding pads arranged between an upper side of the yaw ring and a sliding structure of the nacelle; and
a plurality of lower sliding pads arranged between a lower side of the yaw ring and the sliding structure;
wherein the sliding pads are fixed to the yaw ring and at least one radial opening is provided in the sliding structure allowing access to the upper sliding pads or the lower sliding pads;
wherein the sliding structure comprises a bedframe sliding on the upper sliding pads and a bottom clamp ring sliding on the lower sliding pads attached either to an intermediate ring which is attached to the bedframe or directly to the bedframe, with the at least one radial opening being provided in the intermediate ring or the bedframe.

2. The wind turbine according to claim 1, wherein two axially displaced radial openings are provided in the sliding structure, with an upper opening allowing access to the upper sliding pads and a lower opening allowing access to the lower sliding pads.

3. The wind turbine according to claim 2, wherein the upper opening and the lower opening are displaced for 180° around a circumference of the sliding structure.

4. The wind turbine according to claim 1, wherein the clamp ring and the bedframe or the clamp ring, the intermediate ring and the bedframe are fixed together by means of a bolt connection.

5. The wind turbine according to claim 1, wherein the at least one radial opening is a slot.

6. The wind turbine according to claim 1, wherein the yaw ring comprises an upper ring shaped recess and a lower ring shaped recess into which the upper sliding pads and the lower sliding pads are inserted.

7. The wind turbine according to claim 1, wherein the yaw ring is attached to a radial flange of the tower by bolt connections.

8. A wind turbine, comprising:
a tower; and
a nacelle rotatable relative to the tower by means of a yaw bearing arrangement comprising a yaw ring fixed relative to the tower;
a plurality of upper sliding pads arranged between an upper side of the yaw ring and a sliding structure of the nacelle; and
a plurality of lower sliding pads arranged between a lower side of the yaw ring and the sliding structure;
wherein the sliding pads are fixed to the yaw ring and two axially displaced radial openings are provided in the sliding structure, with an upper opening allowing access to the upper sliding pads and a lower opening allowing access to the lower sliding pads.

9. The wind turbine according to claim 8, wherein the upper opening and the lower opening are displaced for 180° around a circumference of the sliding structure.

10. A wind turbine, comprising:
a tower; and
a nacelle rotatable relative to the tower by means of a yaw bearing arrangement comprising a yaw ring fixed relative to the tower;
a plurality of upper sliding pads arranged between an upper side of the yaw ring and a sliding structure of the nacelle; and
a plurality of lower sliding pads arranged between a lower side of the yaw ring and the sliding structure;
wherein the sliding pads are fixed to the yaw ring and at least one radial opening is provided in the sliding structure allowing access to the upper sliding pads or the lower sliding pads;
wherein the yaw ring comprises an upper ring shaped recess and a lower ring shaped recess into which the upper sliding pads and the lower sliding pads are inserted.

* * * * *